United States Patent [19]

Nakatuka

[11] Patent Number: 5,777,530
[45] Date of Patent: Jul. 7, 1998

[54] SWITCH ATTENUATOR

[75] Inventor: Tadayoshi Nakatuka, Toyonaka, Japan

[73] Assignee: Matsushita Electric Industrial Co., Ltd., Kadoma, Japan

[21] Appl. No.: 788,036

[22] Filed: Jan. 23, 1997

[30] Foreign Application Priority Data

Jan. 31, 1996 [JP] Japan .................... 8-014940

[51] Int. Cl.$^6$ .................. H01P 1/15; H01P 5/12
[52] U.S. Cl. .................. 333/104; 333/81 A; 455/80; 455/83
[58] Field of Search .................. 333/101, 103, 333/104, 81 R, 81 A; 455/78-83; 327/403, 404, 407-409, 415, 416

[56] References Cited

U.S. PATENT DOCUMENTS

| | | | |
|---|---|---|---|
| 3,646,484 | 2/1972 | Maxwell et al. | 333/103 X |
| 4,656,364 | 4/1987 | Yokogawa et al. | 307/112 |
| 4,843,354 | 6/1989 | Fuller et al. | 333/104 X |
| 4,959,873 | 9/1990 | Flynn et al. | 333/104 X |
| 5,327,017 | 7/1994 | Fischer et al. | 333/103 X |
| 5,339,083 | 8/1994 | Inami | 342/157 |

FOREIGN PATENT DOCUMENTS

| | | |
|---|---|---|
| 0578160 | 1/1994 | European Pat. Off. |
| 0625831 | 11/1994 | European Pat. Off. |
| 0700169 | 3/1996 | European Pat. Off. |
| 2684491 | 6/1993 | France |

*Primary Examiner*—Paul Gensler
*Attorney, Agent, or Firm*—Renner, Otto, Boisselle & Sklar, P.L.L.

[57] ABSTRACT

The switch attenuator of the invention includes: a first terminal connected to an antenna; a second terminal connected to a transmitter; and a third terminal connected to a receiver, thereby switching a first state and a second state. In the first state, the first terminal is connected to the second terminal, the first terminal is electrically isolated from the third terminal, the third terminal is connected to a ground and the switch attenuator is electrically controllable so as to vary an attenuation amount between the first terminal and the second terminal while maintaining such a relationship that an impedance Z1 viewed from the first terminal is substantially equal to an impedance Z2 viewed from the second terminal, and in the second state, the first terminal is connected to the third terminal, the first terminal is electrically isolated from the second terminal, the second terminal is connected to a ground and the switch attenuator is electrically controllable so as to vary an attenuation amount between the first terminal and the third terminal, while maintaining such a relationship that the impedance Z1 viewed from the first terminal is substantially equal to an impedance Z3 viewed from the third terminal.

10 Claims, 11 Drawing Sheets

SWITCH ATTENUATOR

BACKGROUND OF THE INVENTION

1. Field of the Invention:

The present invention relates to a switch attenuator including a radio frequency switch and a radio frequency attenuator for use in a radio frequency transceiver circuit and also relates to a semiconductor device implementing such a switch attenuator and radio frequency equipment using such a semiconductor device.

2. Description of the Related Art:

FIG. 1 is a block diagram showing a radio frequency (hereinafter, abbreviated as "RF") section 10 in a prior art transceiver circuit. The RF section 10 of the transceiver circuit includes an RF switch 120, thereby selectively performing transmission and reception. At the time of transmission, a signal input to a modulated signal input terminal (MOD in) 110 is passed through a frequency converter (hereinafter, simply referred to as a "mixer") 112, a variable gain amplifier or automatic gain control amplifier (hereinafter, simply referred to as an "AGC amp") 114, a power amplifier (PA) 116, an RF switch (RF SW) 120 and a frequency filter 122 and then radiated into the air via an antenna 130.

Conversely, at the time of reception, a signal received by the antenna 130 is passed through the frequency filter 122, the RF switch 120, an attenuator 150, a low noise amplitier (LNA) 152 and a mixer 154 so as to be output through an intermediate frequency (hereinafter, abbreviated as "IF") signal output terminal (IF out) 156.

In both cases of transmission and reception, a phase locked loop (hereinafter, abbreviated as a "PLL") 170 and an oscillator 172 generate a locally oscillated signal having a desired frequency and then output the signal to a signal divider (DIV) 174. The mixer 112 mixes the modulated signal and the locally oscillated signal, thereby producing an RF signal and outputting the signal to the AGC amp 114. The mixer 154 mixes the RF signal and the locally oscillated signal, thereby producing an IF signal and outputting the signal to the IF signal output terminal 156.

Hereinafter, the operation of the RF section 10 shown in FIG. 1 will be described. The RF section 10 may be implemented, for example, as a part of a mobile communication unit such as a cellular phone terminal unit. In most cases, an antenna 130 of a relatively large volume (herein assumed to include a frequency filter 122 as well) for a mobile communication unit is commonly used for a transmitter circuit and a receiver circuit in order to simplify the unit configuration thereof. Since the antenna section is commonly used for transmission and reception, the antenna 130 is electrically coupled to the power amplifier 116 and electrically isolated from the low noise amplifier 152 at the time of transmission. Conversely, at the time of reception, the antenna 130 is electrically isolated from the power amplifier 116 and electrically coupled to the low noise amplifier 152. An RF switch 120 formed as a semiconductor device is generally employed for switching transmission and reception in such a manner. In a prior art RF switch 120, a transistor is used as a switching element and is electrically controlled to be either in ON state or in OFF state.

In general, a terminal unit (e.g. a cellular phone hand set per se) for mobile communication performs communication by transmitting an RF signal to a nearest base station and receiving an RF signal from the base station. In order to keep the power received by the base station substantially constant, it is necessary to finely control the power transmitted from the terminal unit in accordance with the distance between the terminal unit and the base station. On the other hand, in order to keep the power output through the IF signal output terminal 156 of the terminal unit substantially constant, it is necessary to control the RF power input to the low noise amplifier 152. For satisfying these requirements, the RF section 10 of a terminal unit generally includes an AGC amp 114 for transmission and an attenuator 150 for reception.

FIG. 2 is a circuit diagram of a prior arL switch 20. As shown in FIG. 2, the switch 20 includes: field effect transistors (hereinafter, abbreviated as "FETs") 200 to 203; impedance-adjusting resistors 210 and 211, gate-biasing resistors 220 to 223; an antenna terminal 230; a transmission power input terminal 231; a reception power output terminal 232; a first control terminal 245; and a second control terminal 246.

Hereinafter, the operation of the switch 20 shown in FIG. 2 will be described. At the time of transmission, a negative voltage larger than the absolute value of the threshold of the FETs 201 and 202 is applied to the second control terminal 246, thereby turning the FETs 201 and 202 into OFF state, while a zero voltage or a positive voltage is applied to the first control terminal 245, thereby turning the FETs 200 and 203 into ON state. As a result, a power to be transmitted is passed through the terminal 231, the FET 200 and the antenna terminal 230 to be output to the antenna 250.

Conversely, at the time of reception, a negative voltage larger than the absolute value of the threshold of the FETs 200 and 203 is applied to the first control terminal 245, thereby turning the FETs 200 and 203 into OFF state, while a zero voltage or a positive voltage is applied to the second control terminal 246, thereby turning the FETs 201 and 202 into ON state. As a result, a received power is passed through the antenna 250, the terminal 230 and the FET 201 to be output to the terminal 232.

In a mobile terminal unit such as a cellular phone unit, the size and the weight of the unit is required to be reduced for, enhancing the portability thereof and the costs thereof are also required to be lowered. In order to fulfill such requirements, reduction in the circuit size and the costs of an RF section is presently an urgent task to be solved. However, in accordance with any conventional technology mentioned above, a transceiver circuit is required to separately include a switch, an AGC amp and an attenuator. Consequently, a prior art transceiver circuit has a problem in that the size. and the costs thereof cannot but be disadvantageously large.

SUMMARY OF THE INVENTION

The switch attenuator of the invention included: a first terminal connected to an antenna; a second terminal connected to a transmitter; and a third terminal connected to a receiver, thereby switching a first state and a second state. In the switch attenuator, in the first state, the first terminal is connected to the second terminal, the first terminal is electrically isolated from the third terminal, the third terminal is connected to a ground and the switch attenuator is electrically controllable so as to vary an attenuation amount between the first terminal and the second terminal, while maintaining such a relationship that an impedance Z1 viewed from the first terminal is substantially equal to an impedance Z2 viewed from the second terminal, said in the second state, the first terminal is connected to the third terminal, the first terminal is electrically isolated from the second terminal, the second terminal is connected to a ground and the switch attenuator is electrically controllable so as to vary an attenuation amount between the first terminal and the third terminal, while maintaining such a relationship that the impedance Z1 viewed from the first terminal is substantially equal to an impedance Z3 viewed from the third terminal.

In one embodiment, a first transistor is provided between the first terminal and a ground, a second transistor is provided between the second terminal and the ground, a third transistor is provided between the third terminal and the ground, a fourth transistor is provided between the first terminal and the second terminal and a fifth transistor is provided between the first terminal and than third terminal, and in the first state, the third transistor is in ON state and the fifth transistor is in OFF state, and in the second state, the third transistor is state and the fifth transistor is in OFF state.

In another embodiment, the impedance Z1 is substantially included within a range from 0.5×ZA to 2.0×ZA, the impedance Z2 is substantially included within a range from 0.5×ZT to 2.0×ZT and the impedance Z3 is substantially included within a range from 0.1×ZR to 2.0×ZR, where ZA, ZT and ZR denote impedances of the antenna, the transmitter and the receiver respectively.

In still another embodiment, each of the first, second, third, fourth and fifth transistors is a dual-gate field effect transistor having a drain, a source and two gates, one of the two gates being connected to the drain, the other of the two gates being connected to the source and each of the two gates receiving a voltage for an electrical control via a corresponding resistance.

The switch attenuator according to another aspect the invention includes: a first terminal connected to a first antenna; a second terminal connected to a transmitter; a third terminal connected to a receiver; and a fourth terminal connected to a second antenna, thereby switching a first state, a second state, a third state and a fourth state. In the switch attenuator, in the first state, the first terminal is connected to the second terminal and is electrically isolated from the third terminal, the third terminal is connected to a ground, the fourth terminal is electrically isolated from the first, second and third terminals and the ground and the switch attenuator is electrically controllable so as to vary an attenuation amount between the first terminal and the second terminal, while maintaining such a relationship that an impedance Z1 viewed from the first terminal is substantially equal to an impedance Z2 viewed from the second terminal, and in the second state, the first terminal is connected to the third terminal and is electrically isolated from the second terminal, the second terminal is connected to a ground, the fourth terminal is electrically isolated from the first, second and third terminals and the ground and the switch attenuator is electrically controllable so as to vary an attenuation amount between the first terminal and the third terminal, while maintaining such a relationship that the impedance Z1 viewed from the first terminal is substantially equal to an impedance Z3 viewed from the third terminal, and in the third state, the fourth terminal is connected to the second terminal and is electrically isolated from the third terminal, the third terminal is connected to the ground, the first terminal is electrically isolated from the second, third and fourth terminals and the ground and the switch attenuator is electrically controllable so as to vary an attenuation amount between the fourth terminal and the second terminal, while maintaining such a relationship that an impedance Z4 viewed from the fourth terminal is substantially equal to the impedance Z2 viewed from the second terminal, and in the fourth state, the fourth terminal is connected to the third terminal and is electrically isolated from the second terminal, the second terminal is connected to the ground, the first terminal is electrically isolated from the second, third and fourth terminals and the ground and the switch attenuator is electrically controllable so as to vary an attenuation amount between the fourth terminal and the third terminal, while maintaining such a relationship that the impedance Z4 viewed from the fourth terminal is substantially equal to the impedance Z3 viewed from the third terminal.

In one embodiment, a first transistor is provided between the first terminal and a ground, a second transistor is provided between the second terminal and the ground, a third transistor is provided between the third terminal and the ground, a fourth transistor is provided between the first terminal and the second terminal, a fifth transistor is provided between the first terminal and the third terminal, a sixth transistor is provided between the fourth terminal and a ground, a seventh transistor is provided between the second terminal and the fourth terminal and an eighth transistor is provided between the third terminal and the fourth terminal, and in the first state, the third transistor is in ON state and the fifth, sixth, seventh and eighth transistors are in OFF state, and in the second state, the second transistor is in ON state and the fourth, sixth, seventh and eighth transistors are in OFF state, and in the third state, the third transistor is in ON state and the first, fourth, fifth and eighth transistors are in OFF state, and in the fourth state, the second transistor is in ON state and the first, fourth, fifth and seventh transistors are in OFF state.

In another embodiment, the impedances Z1 and Z4 are substantially included within a range from 0.5×ZA to 2.0×ZA, the impedance Z2 is substantially included within a range from 0.5×ZT to 2.0×ZT and the impedance Z3 is substantially included within a range from 0.5×ZR to 2.0×ZR, where ZA, ZT and ZR denote impedances of the antenna, the transmitter and the receiver respectively.

In still another embodiment, the switch attenuator is formed so as to be integrated on a semiconductor substrate.

In still another embodiment, the switch attenuator further includes a power amplifier, the power amplifier being formed so as to be integrated on the semiconductor substrate.

In still another embodiment, the switch attenuator further includes a low noise amplifier, the low noise amplifier being formed so as to be integrated on the semiconductor substrate.

Thus, the invention described herein makes possible the advantage of providing a device of a smaller size and a lighter weight at lower costs which can function as both a switch and an attenuator for a radio frequency transceiver circuit.

This and other advantages of the present invention will become apparent to those skilled in the art upon reading and understanding the following detailed description with reference to the accompanying figures.

DESCRIPTION OF THE PREFERRED EMBODIMENTS

Figure 1:
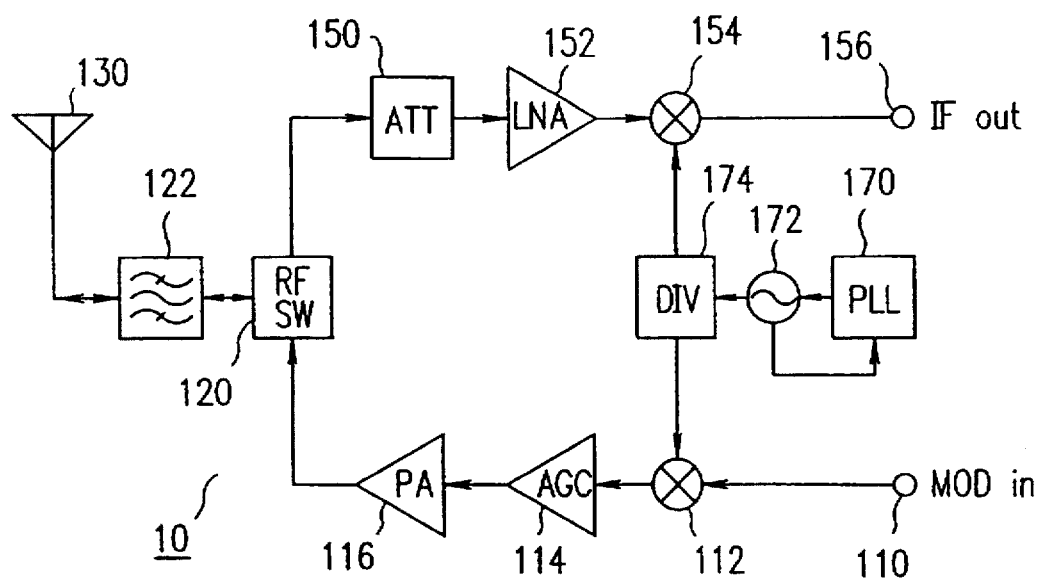
FIG. 1 is a block diagram of a radio frequency section 10 in a prior art transceiver circuit.
Figure 2:
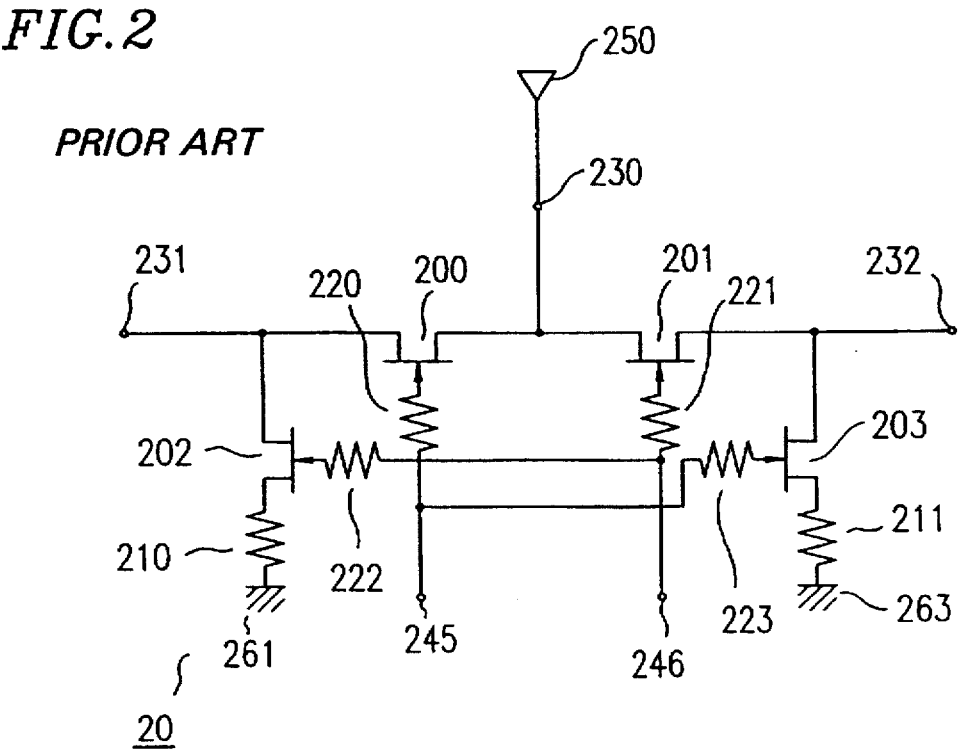
FIG. 2 is a circuit diagram of a prior art switch 20.

Hereinafter, embodiments of the present invention will be described with reference to the accompanying drawings, in which the same reference numerals denote the same components throughout the following examples.

In the present specification, a "switch attenuator" refers to a device having both the function of an RF switch for antenna and that of an RF attenuator, as will be described later and a "node" does not always require a terminal for connecting the device to an external device.

EXAMPLE 1

Figure 3:
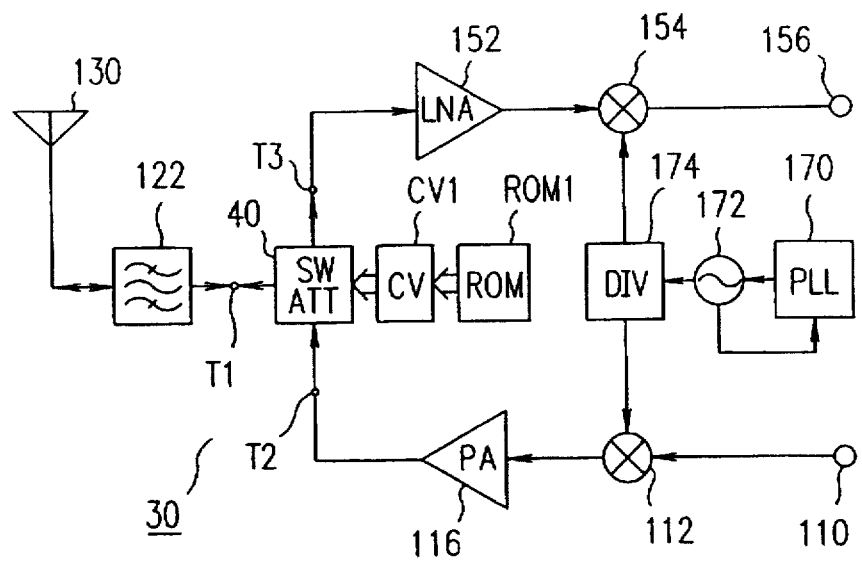
FIG. 3 is a block diagram of an RF section 30 of a cellular phone unit to which a switch attenuator in a first example according to the present invention is applicable.

FIG. 3 is a block, diagram of an RF section 30 of a cellular phone unit to which a switch attenuator in a first example according to the present invention is applicable. A switch attenuator 40 according to the present invention electrically couples an antenna 130 either to a power amplifier 116 or to a low noise amplifier 152 depending upon whether the device is in a transmission state or in a reception state. More specifically, at the time of transmission, the switch attenuator 40 electrically couples nodes T1 and T3 to a node T2 and a ground respectively. On the other hand, at the time of reception, the switch attenuator 40 electrically couples the nodes T1 and T2 to the node T3 and the ground respectively. In the present specification, the negative electrode of a power supply is assumed to be connected to the ground. The ground is assumed to supply a common potential to both a direct current (hereinafter, abbreviated as "DC") signal and an RF signal and is also assumed to be connected to an rf-shielded case and the like. The signals flow through the RF section 30 in a similar manner to the signals described with reference to FIG. 1.

Since the switch attenuator 40 according to the present invention functions both as a switch and an attenuator as will be described later, the switch attenuator makes it possible to attain a remarkable effect of eliminating the ACC amp 114 and the attenuator 150 shown in FIG. 1. In addition, if the switch attenuator 40 is fabricated as an integral part of a semiconductor device, then the size and the costs thereof can be advantageously reduced considerably. It is noted that all the transmission lines connecting the respective blocks wish each other have a characteristic impedance of 50 $\Omega$. Though the RF section 30 is herein used as a part of a cellular phone unit, the RF section 30 may be applied not only to such a unit but also to various kinds of units for transmitting and/or receiving an RF signal. Similarly, the switch attenuator 40 may be widely used as a device for switching and attenuating an RF signal.

In FIG. 3, a control voltage generator CV1 generates control voltages for setting the FETs included within the switch attenuator 40 to be in the respective states shown in Tables 1 to 4 described later, in accordance with the data stored in a read only memory ROM1 and then supplies the control voltages to the respective FETS. The read only memory ROM1 stores therein the data corresponding to the respective states shown in Tables 1 to 4 for generating the control voltages for the FETs.

Figure 4:
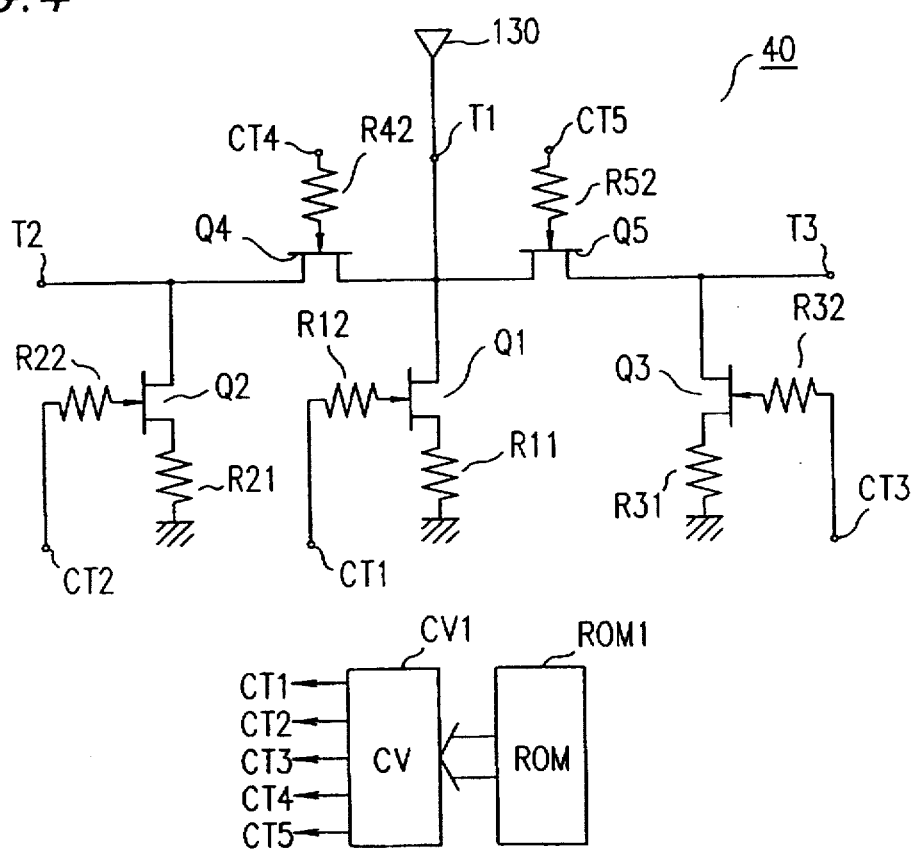
FIG. 4 is a circuit diagram of the switch attenuator in the first example according to the present invention.

FIG. 4 is a circuit diagram of the switch attenuator in the first example according to the present invention. The switch attenuator 40 includes nodes T1, T2 and T3 which are connected to the antenna 130, the power amplifier 116 and the low noise amplifier 152 respectively. The control voltage generator CV1 generates voltages for controlling the FETs in accordance with the data stored in the read only memory ROM1 and then outputs the voltages to the respective nodes CT1 to CT5.

An FET Q1 connects the node T1 to the around at a predetermined impedance. A control voltage received at a node CT1 is applied to the gate of the FET Q1 via a resistance R12, thereby varying the predetermined impedance of the FET Q1. More specifically, the FET Q1 can have a broad impedance ranging from ON state to OFF state. The impedance of the FET Q1 is so low as to be regarded as substantially zero in the ON state but is so high as to be regarded as infinity in OFF state. Since the FET Q1 is an n-channel depletion type FET, a gate-to-source voltage Vgs equal to or higher than 0 [V] may be applied to the FET Q1 for turning the FET Q1 into ON state. On the other hand, a gate-to-source voltage Vgs equal to or lower than a threshold voltage VTH [V] (where VTH <0) may be applied to the FET Q1 for turning the FET Q1 into OFF state. In the present specification, the FET Q1 is assumed to be in "Intermediate State" between ON state and OFF state when the gate-to-source voltage Vgs of the FET Q1 satisfies the relationship; VTH<Vgs<0. In this embodiment, the FET Q1 is a Schottky junction gate type FET (hereinafter, referred to as an "MESFET"). In the present specification, the foregoing description of the FET Q1 is also true of the other FETs Q2 to Q4.

The FETs Q2 and Q3 respectively connect the nodes T2 and T3 to the ground at a predetermined impedance, in the same way as the FET Q1. The control voltages received at nodes CT2 and CT3 are respectively applied to the gate of the FET Q2 via the resistance R22 and the gate of the FET Q3 via the resistance R32, thereby varying the impedances of the corresponding FETS Q2 and Q3. The resistances R12, R22 and R32 are gate-biasing resistance.

Resistances R11, R21 and R31 are respectively provided between the source and the ground of the FETs Q1, Q2 and Q3. When the FETs Q1, Q2 and Q3 are in ON state, these resistances R11, R21 and R31 adjust the impedance between the node T1 and the ground, the impedance between the node T2 and the ground and the impedance between the node T3 and the ground respectively, thereby matching the impedances.

The FETs Q4 and Q5 respectively connect the nodes T2 and T3 to the node T1 at a predetermined impedance, in the same way as the FET Q1. The control voltages received at nodes CT4 and CT5 are respectively applied to The gate of the FET Q4 via the resistance R42 and the gate of the FET Q5 via the resistance R52, thereby varying the impedances of the corresponding FETs Q4 and Q 5.

Next, the operation of the switch attenuator 40 will be described. The switch attenuator 40 has the following four operation modes:

Mode 1: transmission without attenuation;

Mode 2: transmission with attenuation;

Mode 3: reception without attenuation; and

Mode 4: reception with attenuation.

The "attenuation" herein refers to an attenuation between the node T1 and the node T2 or T3. For example, in Mode 1, no attenuation exists between the nodes T1 and T2. Mode 1 is applied to a case where a mobile terminal unit including the RF section 30 is far away from a base station, i.e., a case of supplying an RF signal output from the power amplifier 116 to the RF antenna 130 without attenuating the RF signal. Conversely, Mode 2 is applied to a case where the mobile terminal unit including the RF section 30 is near the base station, i.e., a case of supplying an RF signal output from the power amplifier 116 to the antenna 130 after the RF signal has been attenuated. The rule applied to the case of transmission is also applied to the case of reception. That is to say, Mode 3 is applied to a case where the mobile terminal unit including the RF section 30 is far away from the base station, i.e., a case of supplying an RF signal input through the antenna 130 to the low noise amplifier 152 without attenuating the RF signal. Conversely, Mode 4 is applied to a case where the mobile terminal unit including the RF section 30 is near the base station, i.e., a case of supplying an RF signal input through the antenna 130 to the low voice amplifier 152 after the RF signal has been attenuated.

As will be described later, the switch attenuator 40 of the present invention varies the control voltage of a switching element (i.e., an FET in this case) in Modes 2 and 4, thereby continuously varying the attenuation amount of the switch attenuator 40. As a result, the switch attenuator according to the present invention is particularly advantageous when it is applied to mobile communication where the output power at the time of transmission and the input power at the time of reception can be in a wide range.

(MODE 1)

The states of the FETs Q1 to Q5 of the switch attenuator 40 in Mode 1 are shown in the following Table 1.

TABLE 1

| FET   | Q1  | Q2  | Q3 | Q4 | Q5  |
|-------|-----|-----|-----|-----|-----|
| State | OFF | OFF | ON | ON | OFF |

In order to realize Mode 1 of the switch attenuator 40, control voltages corresponding to the respective states may be applied to the nodes CT1 to CT5 for setting the FETs Q1 to Q5 in the respective states shown in Table 1. As described above, for example, voltages equal to or higher than 0 [V] may be applied to the respective gates for turning the FETs Q1 to Q5 into ON state, and voltages equal to or lower than VTH [V] may be applied to the respective gates for turning the FETs Q1 to Q5 into OFF state.

Figure 5:
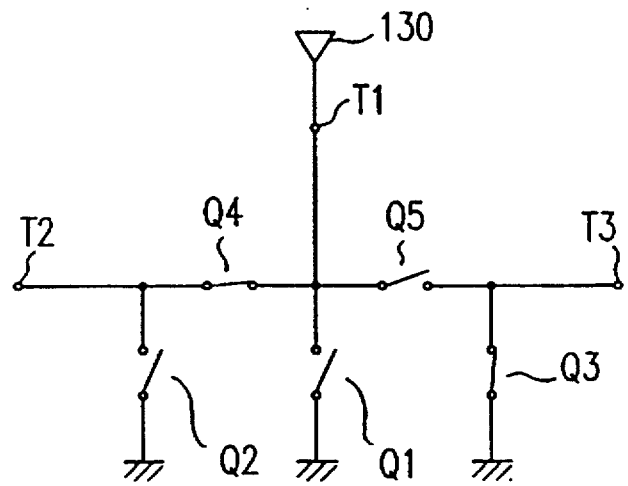
FIG. 5 is an equivalent circuit diagram of a switch attenuator 40 in Mode 1.

FIG. 5 is an equivalent circuit diagram of the switch attenuator 40 in Mode 1. In FIG. 5, a closed switch represents an FET in ON state, while an open switch represents an FET in OFF state. In Mode 1, as shown in FIG. 5, the node T1 is connected to the node T2 via an impedance substantially equal to zero, the node T3 is connected to the ground via an impedance substantially equal to zero and the node T3 is electrically isolated from the nodes T1 and T2. Thus, in Mode 1, an RF signal output from the power amplifier 116 is received at the node T2, passed through the FET Q4 and the node T1 to be supplied to the antenna 130 without being attenuated. On the other hand, the node T3 or the input terminal to the low noise amplifier 152 is connected to the ground via the FET Q3, thereby preventing an unnecessary RF signal from being input to the low noise amplifier 152.

In Mode 1, the insertion loss of the switch attenuator 40 is only about 0.5 dB resulting from the impedance of the FET Q4 in ON state, i.e., an impedance corresponding to an ON resistance.

(MODE 2)

The states of the FETs Q1 to Q5 of the switch attenuator 40 in Mode 2 are shown in the following Table 2 (where "IM" denotes intermediate state).

TABLE 2

| FET   | Q1 | Q2 | Q3 | Q4 | Q5  |
|-------|-----|-----|-----|-----|-----|
| State | IM | IM | ON | IM | OFF |

In order to realize Mode 2 of the switch attenuator 40, control voltages corresponding to the respective states may be applied to the nodes CT1 to CT5 for setting the FETs to Q1 to Q5 in the respective states shown in Table 2. In Modes 2 and 4, several FETs are used in Intermediate state. Voltages satisfying the relationship $0<Vgs<VTH$ may be applied as the gate-to-source voltages Vgs to the respective gates for turning the FETs Q1 to Q5 into Intermediate state.

Figure 6:
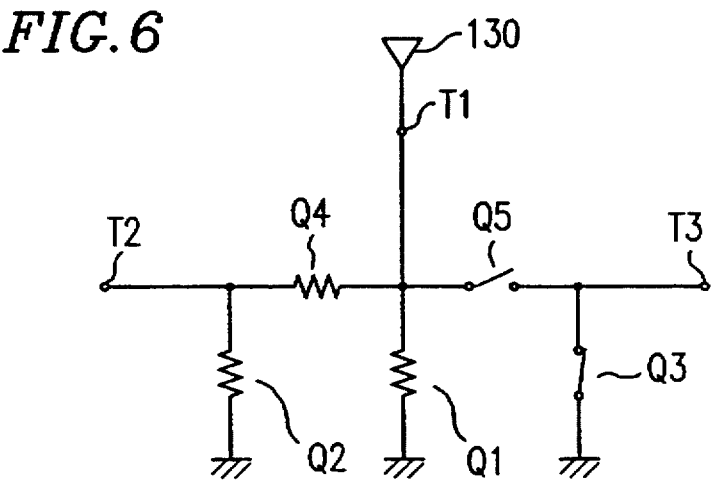
FIG. 6 is an equivalent circuit diagram of the switch attenuator 40 in Mode 2.

FIG. 6 is an equivalent circuit diagram of the switch attenuator 40 in Mode 2. In FIG. 6, a closed switch represents an FET in ON state, an open switch represents an FET in OFF state and a resistance represents an FET in Intermediate state. In the following description, the impedances of the FETs Q1 to Q5 in Intermediate state will be represented by ZQ1 to ZQ5 respectively. In Mode 2, as shown in FIG. 6, the node Ti is connected to the node T2 via an impedance ZQ4 and is connected to the ground via an impedance ZQ1; the node T2 is connected to the ground via an impedance ZQ2 and the node T3 is connected to the ground via an impedance substantially equal to zero and is electrically isolated from the nodes T1 and T2. Thus, in Mode 2, an RF signal output from the power amplifier 116 is received at the node T2, passed through the FETs Q1, Q2 and Q4 and the node T1 and then supplied to the antenna 130 after the RF signal has been attenuated by a desired amount. On the other hand, the node T3 or the input terminal to the low noise amplifier 152 is connected to the ground via the FET Q3, thereby preventing an unnecessary RF signal from being input to the low noise amplifier 152.

In Mode 2, the attenuation amount of the switch attenuator 40 is variable by varying the control voltages applied to the gates of the FETs Q1, Q2 and Q4 or by varying the impedance ZQ1, ZQ2 and ZQ4. The values of the control voltages applied to the gates of the FETs Q1, Q2 and Q4 are stored beforehand in the read only memory ROM1, for example, and read out therefrom in accordance with a necessary attenuation amount. For example, if the control voltage generator CV1 functioning as a programmable voltage generator generates control voltages based on the data representing the control voltages which have been read out from ROM1 and then outputs the voltages to the gates of the respective FETs, then Modes 2 and 4 intended to attenuate the RF signal by a desired amount are realizable. Moreover, date representing the control voltages to be applied to the gates of the FETs Q3 and Q5 (i.e., a voltage equal to or higher than 0 [V] and a voltage equal to or lower than VTH [V] respectively) may also be stored in ROM1. Furthermore, data representing the control voltages to be applied to the FETs Q1 to Q5 in the respective Modes 1, 3 and 4 may also be stored in ROM1.

(MODE 3)

The states of the FETs Q1 to Q5 of the switch attenuator 40 in Mode 3 are shown in the following Table 3.

TABLE 3

| FET | Q1 | Q2 | Q3 | Q4 | Q5 |
|---|---|---|---|---|---|
| State | OFF | ON | OFF | OFF | ON |

In order to realize Mode 3 of the switch attenuator 40, control voltages corresponding to the respective states may be applied to the nodes CT1 to CT5 for setting the FETs Q1 to Q5 in the respective states shown in Table 3.

Figure 7:
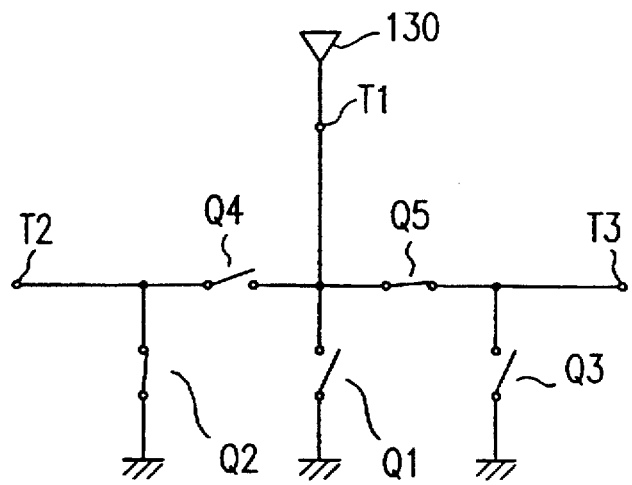
FIG. 7 is an equivalent circuit diagram of the switch attenuator 40 in Mode 3.

FIG. 7 is an equivalent circuit diagram of the switch attenuator 40 in Mode 3. In Mode 3, as shown in FIG. 7, the node T1 is connected to the node T3 via an impedance substantially equal to zero, the node T2 is connected to the ground via an impedance substantially equal to zero and the node T2 is electrically isolated from the nodes T1 and T3. Thus, in Mode 3, an RF signal input through the antenna 130 is received at the node T1, passed through the FET Q5 and the node T3 bind then supplied to the low noise amplifier 152 without being attenuated. On the other hand, the node T2 or the output terminal from the power amplifier 116 is connected to the ground via the FET Q2, thereby preventing an unnecessary RF signal from being output to the low noise amplifier 152.

In Mode 3, the insertion loss of the switch attenuator 40 is only about 0.5 dB resulting from the impedance of the FET Q5 in ON state.

(MODE 4)

The states of the FETs Q1 to Q5 of the switch attenuator 40 in Mode 4 are shown in the following Table 4 (where "IM" denotes Intermediate state).

TABLE 4

| FET | Q1 | Q2 | Q3 | Q4 | Q5 |
|---|---|---|---|---|---|
| State | IM | ON | IM | OFF | IM |

In order to realize Mode 4 of the switch attenuator 40, control voltages corresponding to the respective states may be applied to the nodes CT1 to CT5 for setting the FETs Q1 to Q5 in the respective states shown in Table 4.

Figure 8:
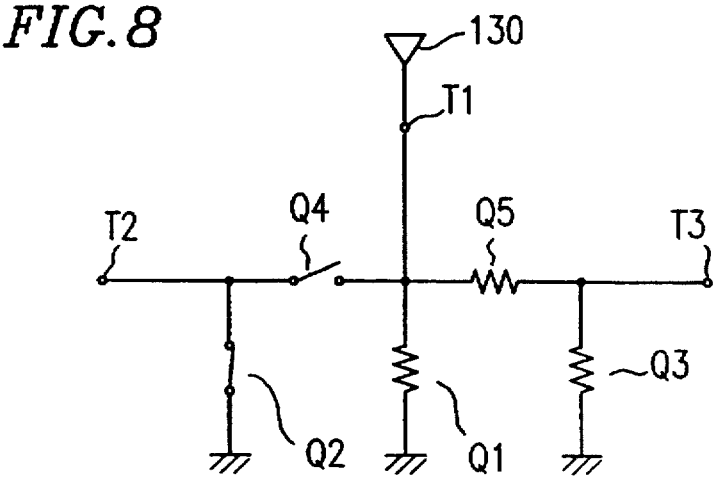
FIG. 8 is an equivalent circuit diagram of the switch attenuator 40 in Mode 4.

FIG. 8 is an equivalent circuit diagram of the switch attenuator 40 in Mode 4. In Mode 4, as shown in FIG. 8, the node T1 is connected to the node T3 via an impedance ZQ5 and is connected to the ground via an impedance ZQ1; the node T3 is connected to the ground via an impedance ZQ3; and the node T2 is connected to the ground via an impedance substantially equal to zero and is electrically isolated from the nodes T1 and T3. Thus, in Mode 4, an RF signal input through the antenna 130 is received at the node T1, passed through the FETs Q1, Q3 and Q5 and the node T3 and then supplied to the low noise amplifier 152 after the RF signal has been attenuated by a desired amount. On the other hand, the node T2 or the output terminal from the power amplifier 116 is connected to the ground via the FET Q2, thereby preventing an unnecessary RF signal from being input to the low noise amplifier 152.

In Mode 4, the attenuation amount of the switch attenuator 40 is variable by varying the control voltages applied to the gates of the FETs Q1, Q3 and Q5 or by varying the impedances ZQ1, ZQ3 and ZQ5. The values of the control voltages applied to the gates of the FETs Q1, Q3 and Q5 are, for example, stored beforehand in the read only memory ROM1 and read out therefrom in accordance with a necessary attenuation amount as described in Mode 2.

In the first example, in Mode 2, the attenuation amount can be varied while substantially satisfying the relationship: ZT1=ZT2=Z0, where the impedance ZT1 represents the impedance of the switch attenuator 40 viewed from the node T1; the impedance ZT2 represents the impedance of the switch attenuator 40 viewed from the node T2; and the impedance ZT0 represents the characteristic impedance (e.g., about 50 Ω) of the circuit connected to an external circuit. Similarly, in the first example, in Mode 4, the attenuation amount can be varied while substantially satisfying the relationship: ZT1=ZT3=Z0, where the impedance ZT3 represents the impedance of the switch attenuator 40 viewed from the node T3.

On the other hand, even when the relationships ZT1=ZT2=Z0 and ZT1=ZT3=Z0 are not satisfied, it is preferable that the following relationships:

0.5×ZA≦ZT1≦2.0×ZA;
0.5×ZT≦ZT2≦2.0×ZT; and
0.5×ZR≦ZT3≦2.0×ZR are satisfied. Herein, the impedance ZA represents the characteristic impedance of a circuit (the antenna 130, in this case) connected to the node T1; the impedance ZT represents the characteristic impedance of a circuit (the power amplifier 116, in this case) connected to the node T2; and the impedance ZR represents the characteristic impedance of a circuit (the low noise amplifier 152, in this case) connected to the node T3.

Figure 9:
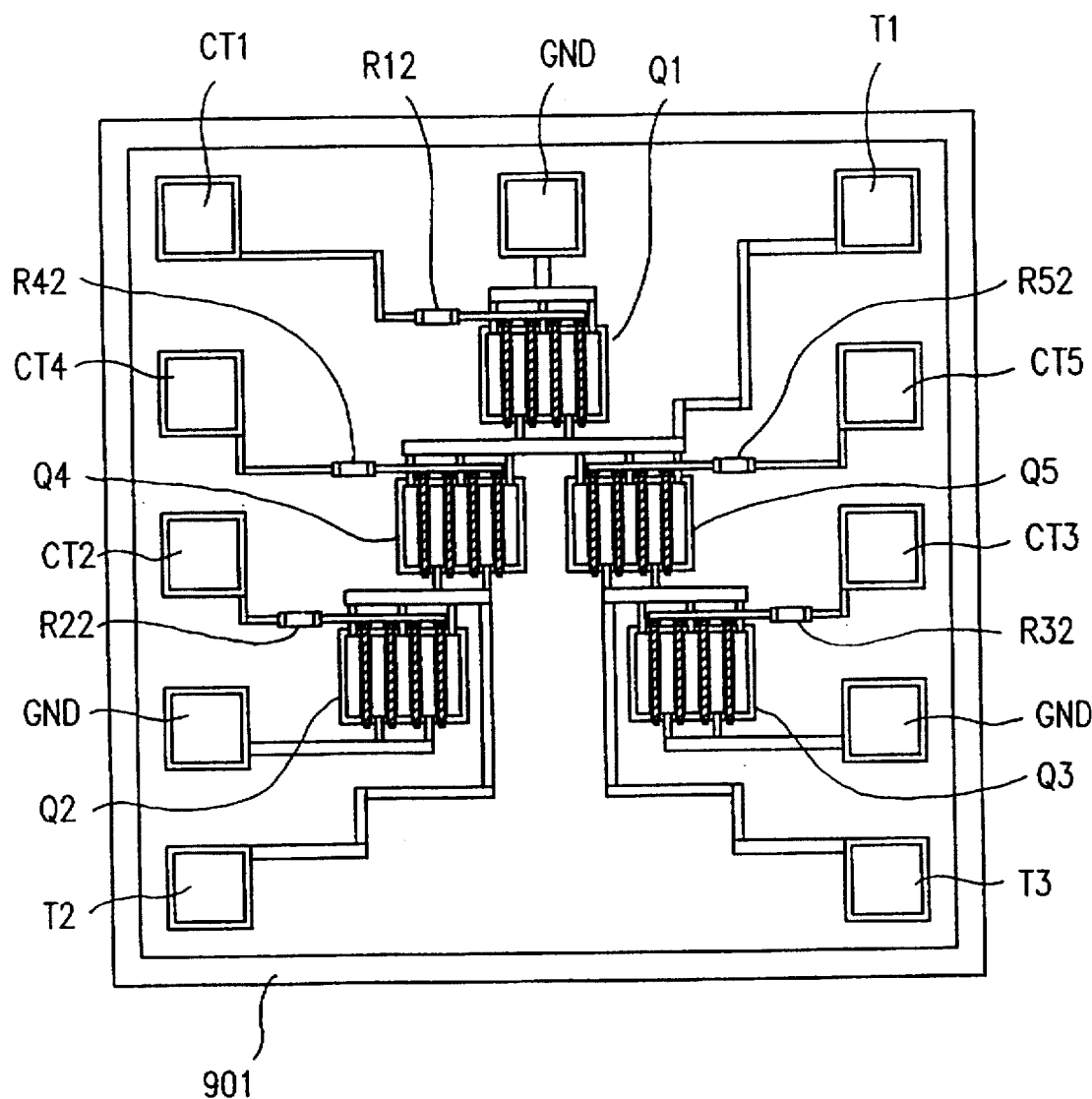
FIG. 9 is a plan view of the switch attenuator 40 of this invention formed to be integrated on a semiconductor substrate.

FIG. 9 is a plan view of the switch attenuator 40 of this invention formed so as to be integrated on a semiconductor substrate. As shown in FIG. 9, the switch attenuator 40 has been formed so as to be integrated on a gallium arsenide (hereinafter, abbreviated as "GaAs") substrate 901. In FIG. 9, GND denotes a ground and the other reference numerals correspond to those used in FIG. 4. The FETs Q1 to Q5 are MESFETs and are formed on the GaAs substrate 901 in accordance with an ion implantation method. The gate length of the FETs Q1 to Q5 is set to be about 0.5 μand the gate width thereof is set to be about 800 μ. A semiconductor chip on which the switch attenuator 40 shown in FIG. 9 has been implemented is used after it has been incorporated and sealed within a resin mold package having 10 pins.

EXAMPLE 2

Figure 10:
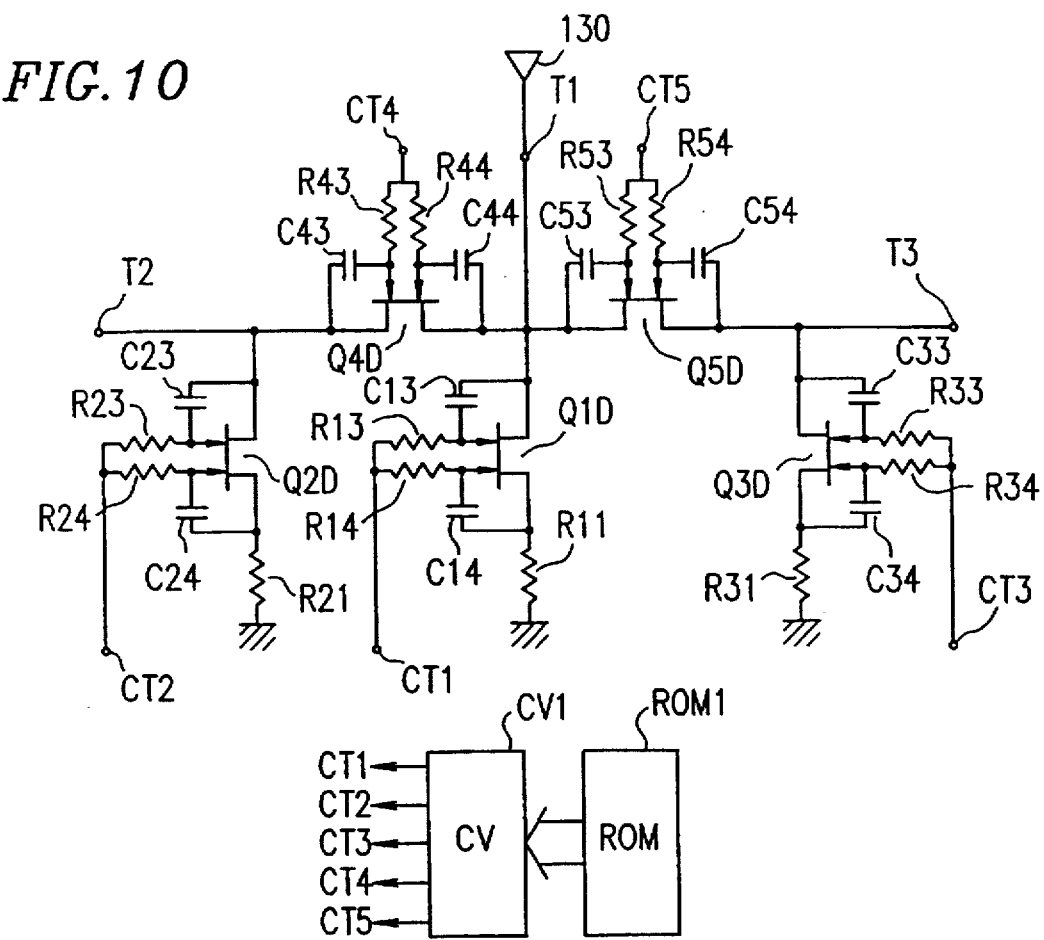
FIG. 10 is a circuit diagram of a switch attenuator in a second example according to the present invention.

FIG. 10 is a circuit diagram of a switch attenuator in a second example according to the present invention. FETs Q1D, Q2D, Q3D, Q4D and Q5D shown in FIG. 10 are dual-gate FETs. Pairs of gate biasing resistors R13 & R14, R23 & R24, R33 & R34, R43 & R44 and R53 & R54 are respectively connected to the first gate and the second gate of the FETs Q1D to Q5D. Capacitors C13, C23, C33, C43 and C53 are respectively connected between the second gates and the drains of the FETs Q1D to Q5D, while capacitors C14, C24, C34, C44 and C54 are respectively connected between the first gates and the sources of the FETs Q1D to Q5D.

The second example is different from the first example in that dual-gate FETs are used instead of the single-gate FETs and that capacitors are connected between the drains and the second gates and between the sources and the first gates. In accordance with the configuration of the second example, the non-linearity of an FET can be reduced, thereby realizing excellent distortion characteristics.

EXAMPLE 3

Figure 11:
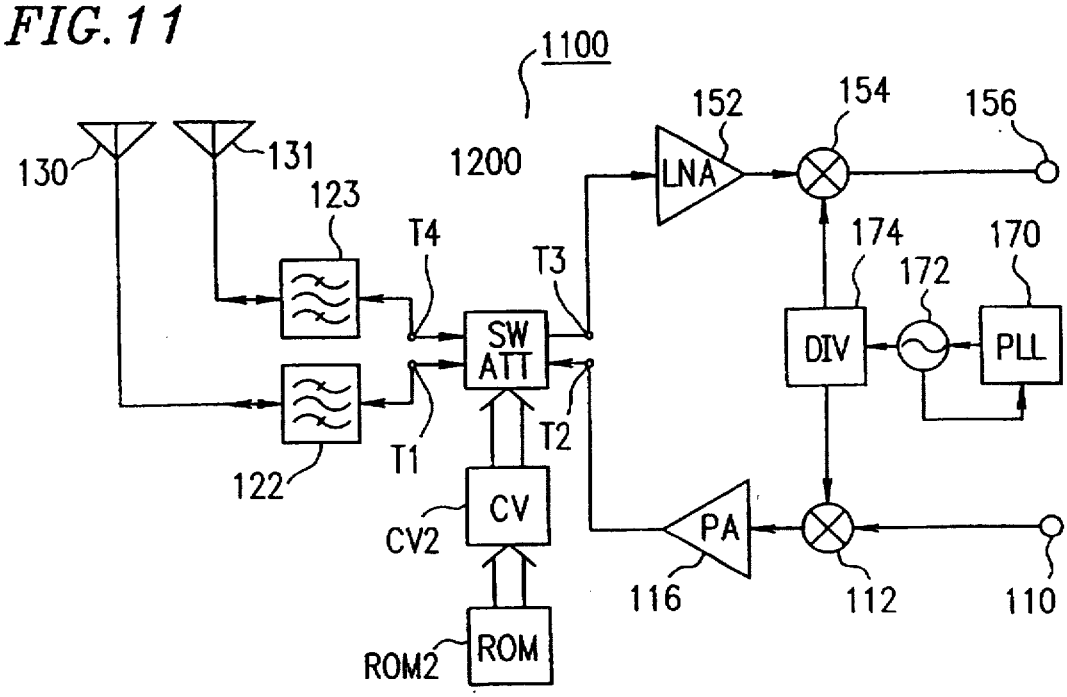
FIG. 11 is a block diagram of an RF section 1100 of a cellular phone unit to which a switch attenuator in a third example according to the present invention is applicable.

FIG. 11 is a block diagram of an RF section 1100 of a cellular phone unit to which a switch attenuator in a third example according to the present invention is applicable. The switch attenuator 1200 according to the present invention electrically couples an antenna 130 or 131 to a power amplifier 116 or a low noise amplifier 152 depending upon whether the unit is in a transmission state or in a reception state.

More specifically, at the time of transmission, the switch attenuator 1200 electrically couples one of nodes T1 and T4 to a node T2; electrically couples a node T3 to a ground; and electrically isolates the other of the nodes T1 and T4, which is not coupled to the node T2, from the other nodes and the ground.

On the other hand, at the time of reception, the switch attenuator 1200 electrically couples one of the nodes T1 and T4 to the node T3; electrically couples the node T2 to the ground; and electronically isolates the other of the nodes T1 and T4, which is not coupled to the node T3, from the other nodes and the ground. In this third example, two antennas 130 and 131 are usable unlike the first example in which a single antenna is used. Thus, the third example makes possible not only the advantages attained in the first example but also another advantage of selectively utilizing two antennas 130 and 131 depending upon whether the unit is in a transmission state or in a reception stale. The configuration of the third example realizes space diversity transmission and reception, for example. It is noted that all the transmission lines connecting the respective blocks shown in FIG. 11 to each other have a characteristic impedance of 50 Ω.

Figure 12:
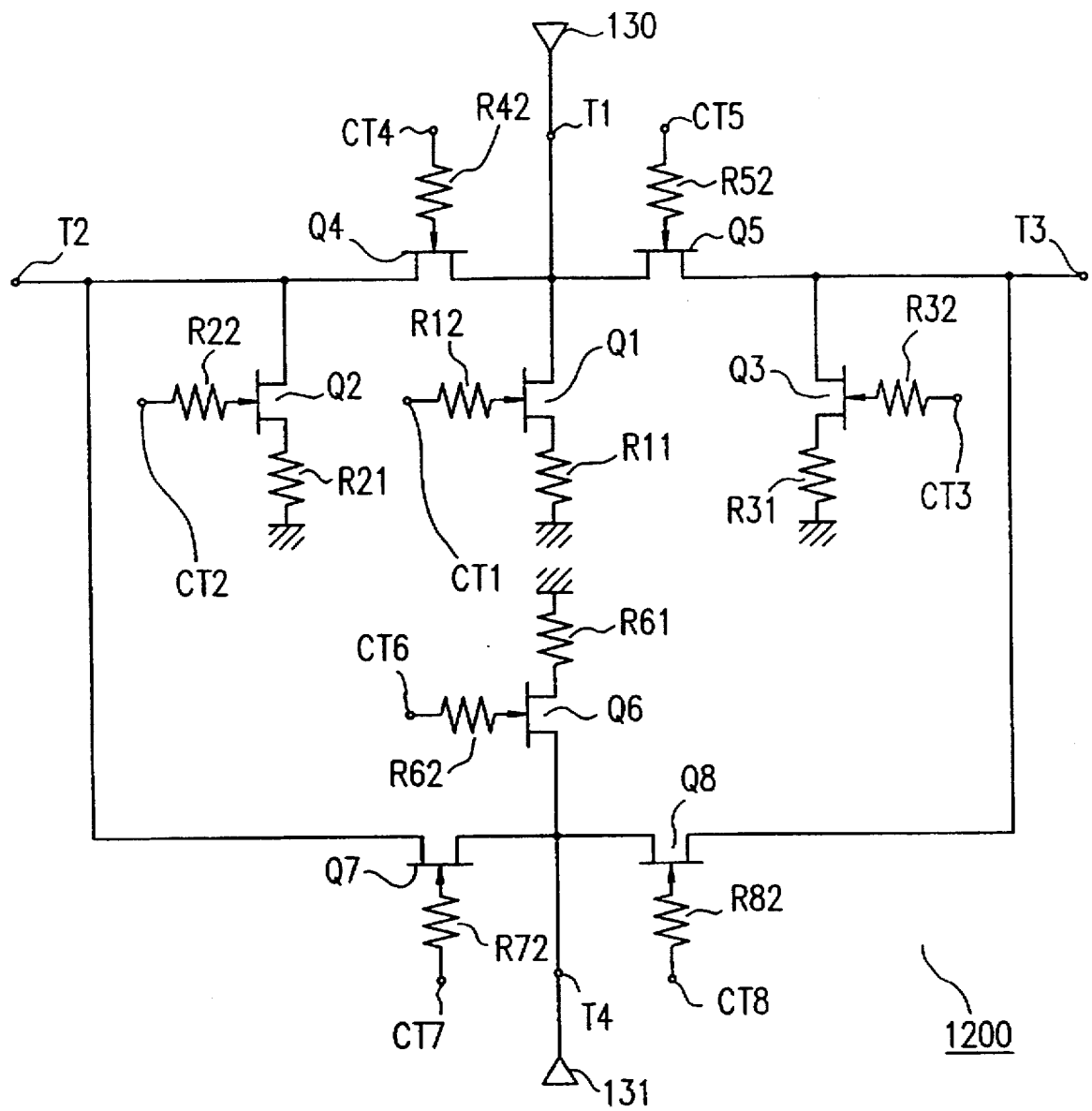
FIG. 12 is a circuit diagram of the switch attenuator in the third example according to the present invention.
Figure 13:
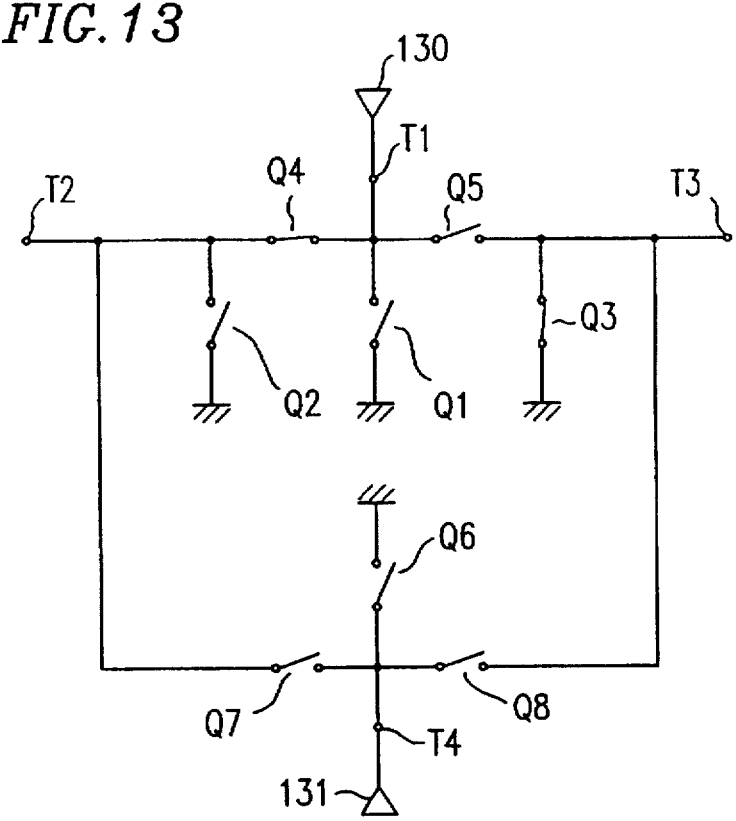
FIG. 13 is an equivalent circuit diagram of a switch attenuator 1200 in Mode 1.
Figure 14:
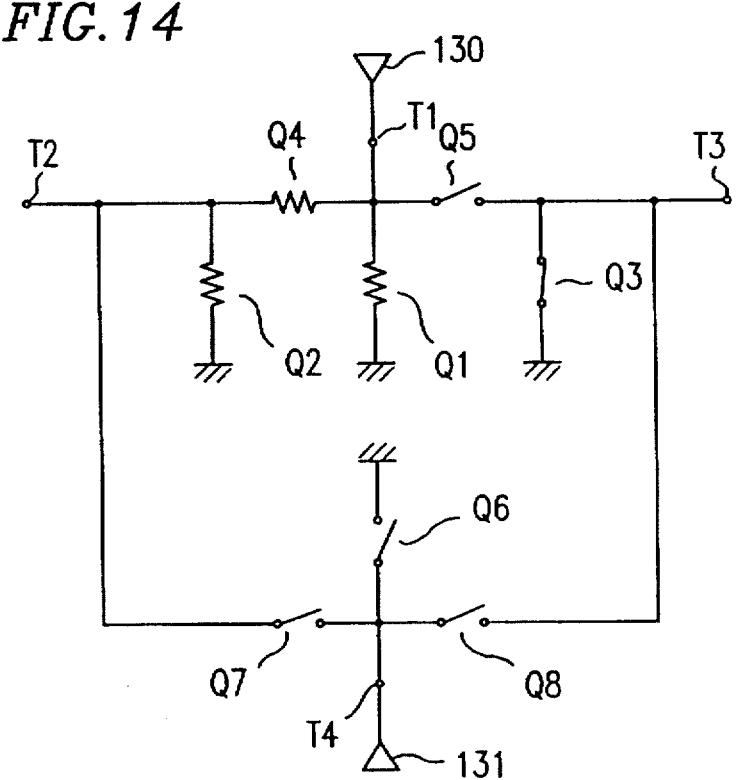
FIG. 14 is an equivalent circuit diagram of the switch attenuator 1200 in Mode 2.
Figure 15:
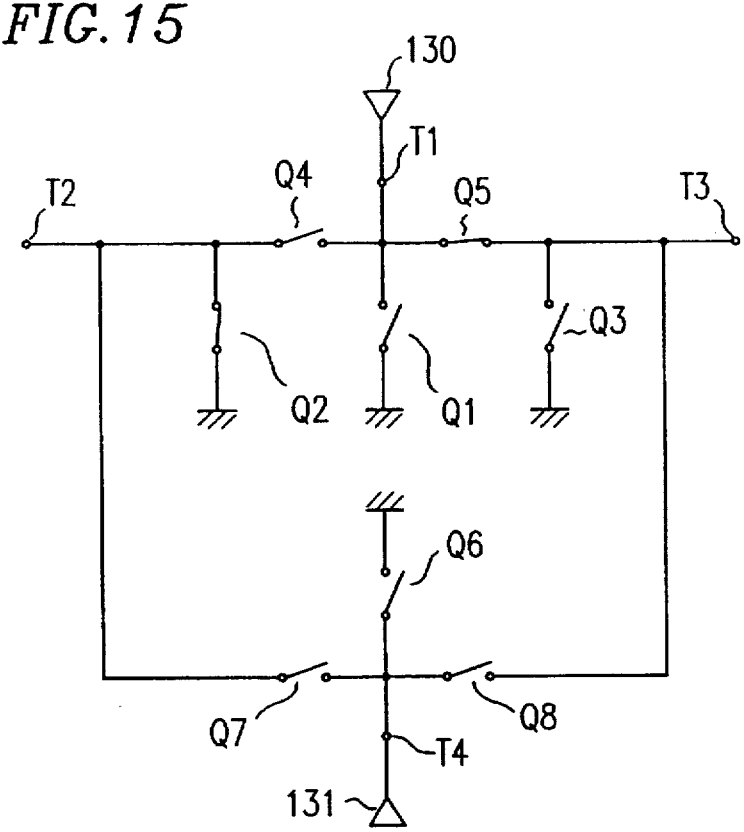
FIG. 15 is an equivalent circuit diagram of the switch attenuator 1200 in Mode 3.
Figure 16:
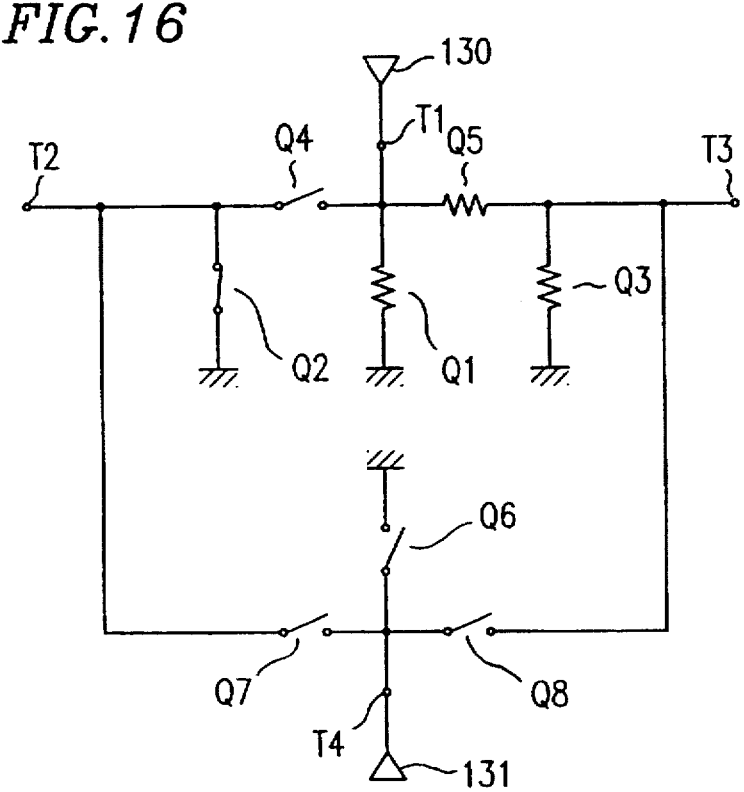
FIG. 16 is an equivalent circuit diagram of the switch attenuator 1200 in Mode 4.
Figure 17:
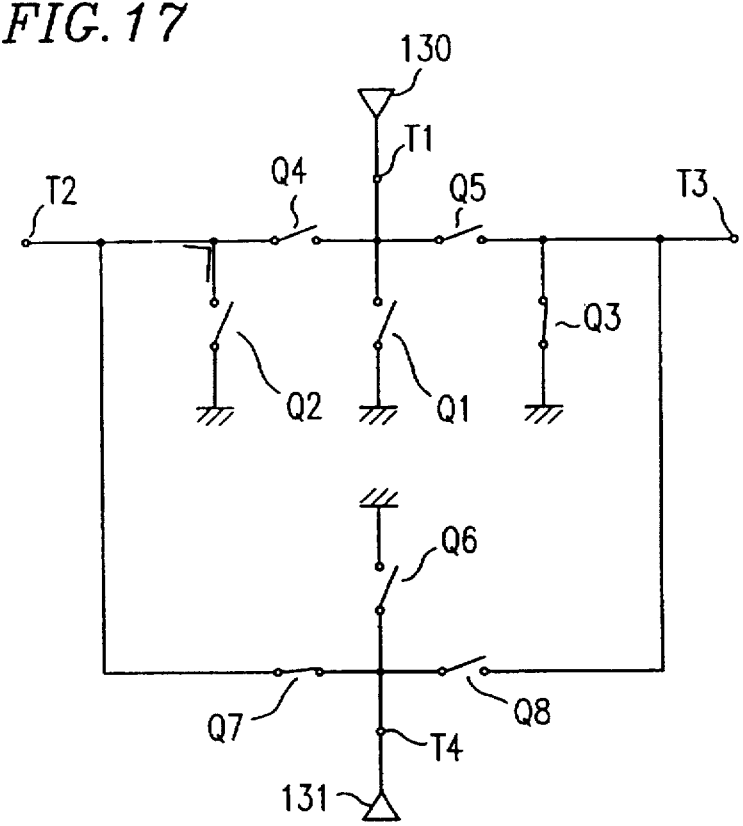
FIG. 17 is an equivalent circuit diagram of the switch attenuator 1200 in Mode 5.
Figure 18:
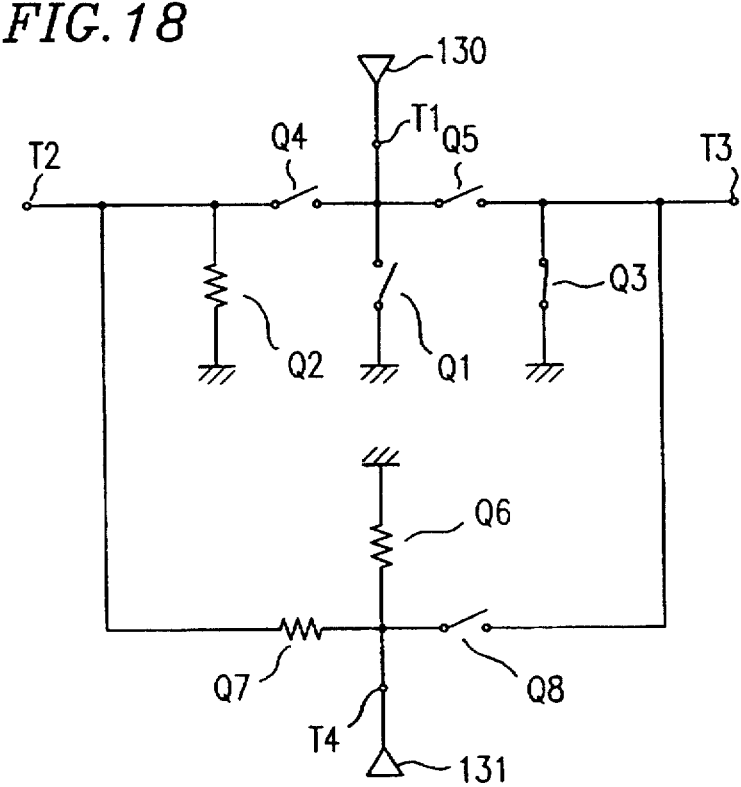
FIG. 18 is an equivalent circuit diagram of the switch attenuator 1200 in Mode 6.
Figure 19:
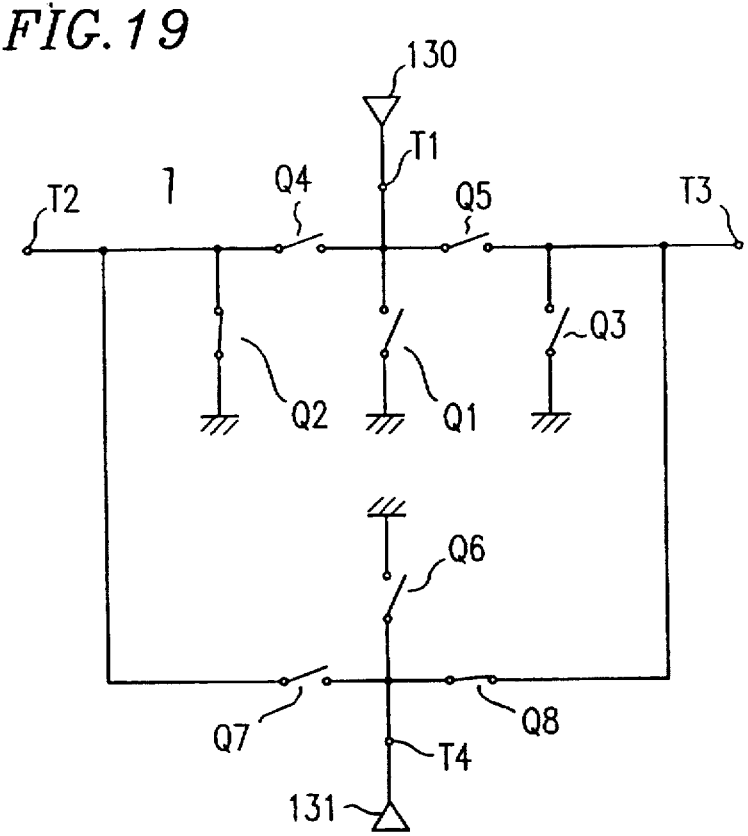
FIG. 19 is an equivalent circuit diagram of the switch attenuator 1200 in Mode 7.
Figure 20:
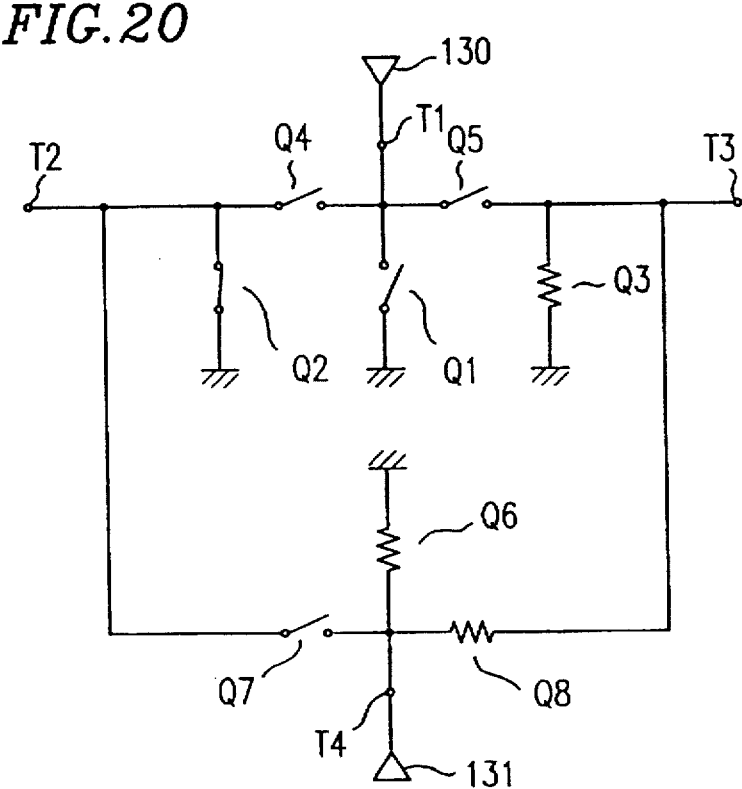
FIG. 20 is an equivalent circuit diagram of the switch attenuator 1200 in Mode 8.

A control voltage generator CV2 and a read only memory ROM2 shown in FIGS. 11 and 12 function similarly to the control voltage generator CV1 and the read only memory ROM1 respectively, except that the nodes to which the FET control voltages are supplied are CT1 to CT8.

FIG. 12 is a circuit diagram of the switch attenuator in the third example according to the present invention. The switch attenuator 1200 further includes: FETs Q6 to Q8; gate-biasing resistances R62, R72 and E82; nodes CT6 to CT8; and a resistance R61 for matching the impedances as well as all the components of the switch attenuator 40 in order to electrically couple the node T4 to one of the nodes T2 and T3.

Next, the operation of the switch attenuator 1200 will be described. The switch attenuator 1200 has the following four operation modes 1 to 8:

Mode 1: transmission without attenuation using antenna 130;

Mode 2: transmission with attenuation using antenna 130;

Mode 3: reception without attenuation using antenna 130;

Mode 4: reception with attenuation using antenna 130;

Mode 5: transmission without attenuation using antenna 131;

Mode 6: transmission with attenuation using antenna 131;

Mode 7: reception without attenuation using antenna 131; and

Mode 8: reception with attenuation using antenna 131.

Modes 1 to 4 of the third example respectively correspond to Modes 1 to 4 of the first example. Modes 5 to 8 of the third example are the same as Modes 1 to 4 respectively except that not the node T1 but the node T4 is electrically coupled to the node T2 or T3.

In order to realize Modes 1 to 8 of the switch attenuator 1200, control voltages corresponding to the respective states may be applied to the nodes CT1 to CT8 for setting the FETs Q1 to Q8 in the respective states shown in the following Tables 5 to 12 (where "IM" denotes Intermediate state). FIGS. 13 through 20 are equivalent circuit diagrams of the switch attenuator 1200 in Modes 1 to 8 respectively.

TABLE 5

| FET | Q1 | Q2 | Q3 | Q4 | Q5 | Q6 | Q7 | Q8 |
|---|---|---|---|---|---|---|---|---|
| State | OFF | OFF | ON | ON | OFF | OFF | OFF | OFF |

TABLE 6

| FET | Q1 | Q2 | Q3 | Q4 | Q5 | Q6 | Q7 | Q8 |
|---|---|---|---|---|---|---|---|---|
| State | IM | IM | ON | IM | OFF | OFF | OFF | OFF |

TABLE 7

| FET | Q1 | Q2 | Q3 | Q4 | Q5 | Q6 | Q7 | Q8 |
|---|---|---|---|---|---|---|---|---|
| State | OFF | ON | OFF | OFF | ON | OFF | OFF | OFF |

TABLE 8

| FET | Q1 | Q2 | Q3 | Q4 | Q5 | Q6 | Q7 | Q8 |
|---|---|---|---|---|---|---|---|---|
| State | IM | ON | IM | OFF | IM | OFF | OFF | OFF |

TABLE 9

| FET | Q1 | Q2 | Q3 | Q4 | Q5 | Q6 | Q7 | Q8 |
|---|---|---|---|---|---|---|---|---|
| State | OFF | OFF | ON | OFF | OFF | OFF | ON | OFF |

TABLE 10

| FET | Q1 | Q2 | Q3 | Q4 | Q5 | Q6 | Q7 | Q8 |
|---|---|---|---|---|---|---|---|---|
| State | OFF | IM | ON | OFF | OFF | IM | IM | OFF |

TABLE 11

| FET | Q1 | Q2 | Q3 | Q4 | Q5 | Q6 | Q7 | Q8 |
|---|---|---|---|---|---|---|---|---|
| State | OFF | ON | OFF | OFF | OFF | OFF | OFF | ON |

TABLE 12

| FET | Q1 | Q2 | Q3 | Q4 | Q5 | Q6 | Q7 | Q8 |
|---|---|---|---|---|---|---|---|---|
| State | OFF | ON | IM | OFF | OFF | IM | OFF | IM |

In the third example, in Modes 2 and 4, the attenuation amount can be varied while substantially satisfying the relationships: ZT1=ZT2=Z0 and ZT1=ZT3=Z0 in the same way as in the first example. Similarly, in the third example, in Mode 6 and 8, the attenuation amount can be varied while substantially satisfying the relationships: ZT4=ZT2=Z0 and ZT4=ZT3=Z0, where the impedance ZT4 represents the impedance of the switch attenuator 1200 viewed from the node T4.

On the other hand, even when the relationships: ZT1=ZT2=Z0; ZT1=ZT3=Z0; ZT4=4T2=Z0; and ZT4=ZT3=Z0 are not satisfied, it is preferable that the following relationships:

0.5×ZA≦ZT1≦2.0×ZA;

0.5×ZT≦ZT2≦2.0×ZT;

0.5×ZR≦ZT3≦2.0×ZR; and 0.5×ZB≦ZT4≦2.0×ZB;

are satisfied. Herein, the impedance ZB represents the characteristic impedance of a circuit (the antenna 131, in this case) connected to the node T4.

In the foregoing first to third examples, the FETs are set in Intermediate state between ON state and OFF state, thereby flexibly dealing with such a situation that the characteristics of a circuit connected to the switch attenuator have been varied. Such a variation of a connected circuit may occur, for example, when the power output from a power amplifier for transmission has been varied.

In the foregoing examples, a desired characteristic impedance can be obtained in a frequency band usable for a communication between a cellular phone unit and a base station, for example. However, the switch attenuator according to the present invention is applicable not only to this frequency band but also to an entire RF band.

By replacing the FETs of the third example by dual-gate FETs in accordance with the disclosure of the second example, another advantage of realizing excellent distortion characteristics may also be attained.

An FET used in the switch attenuator according to the present invention is not limited to a depletion-type FET. An enhancement-type FET may also be used instead. In the foregoing description, an FET is assumed to be a MESFET. Alternatively, any device may also be used as the FET so long as the device has a control terminal for electrically controlling the impedances. For example, a PIN diode, a PN junction type FET, a MOS type FET or the like may also be used, if various conditions including a used frequency and a parasitic capacitance specific to the adopted device permit.

Moreover, if the switch attenuator according to the present invention is formed on a semiconductor substrate so as to be integrated with a power amplifier or a low noise amplifier, then the size and the costa thereof can be advantageously reduced.

The control voltage generators CV1 and CV2 and the read only memories ROM1 and ROM2 may be configured in a different manner from those described in the foregoing examples so long as the control voltage generators and the ROMs make it possible to generate control voltages for setting the FETs of the switch attenuator according to the present invention to be in ON state, OFF state or Intermediate state. For example, a programmable voltage generator having no memories for storing data digitally may also be used. Similarly, random access memories may also be used instead of the read only memories ROM1 and ROM2.

As shown in Tables 2, 4, 6, 8, 10 and 12, three FETs are set in Intermediate State at the time of transmission with attenuation and at the time of reception with attenuation in the foregoing examples. However, the number of FETs in Intermediate State is not limited to three. The number may be arbitrarily set so long as at least one FET in Intermediate State provides a desired amount of attenuation.

As is apparent from the foregoing description, according to the present invention, a single semiconductor device enables to switch transmission and reception, to switch a plurality of antennas and to freely control the attenuation amount. In addition, it is possible to attain remarkable effects of reducing the size, the weight and the costs of the equipment.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A switch attenuator comprising: a first terminal connected to an antenna; a second terminal connected to a transmitter; and a third terminal connected to a receiver, thereby switching a first state and a second state, wherein in the first state, the first terminal is connected to the second terminal, the first terminal is electrically isolated from the third terminal, the third terminal is connected to a ground and the switch attenuator is electrically controllable so as to vary an attenuation amount between the first terminal and the second terminal, while maintaining such a relationship that an impedance Z1 viewed from the first terminal is substantially equal to an impedance Z2 viewed from the second terminal, and wherein in the second state, the first terminal is connected to the third terminal, the first terminal is electrically isolated from the second terminal, the second terminal is connected to a ground and the switch attenuator is electrically controllable so as to vary an attenuation amount between the first terminal and the third terminal, while maintaining such a relationship that the impedance Z1 viewed from the first terminal is substantially equal to an impedance Z3 viewed from the third terminal.

2. A switch attenuator according to claim 1 wherein a first transistor is provided between the first terminal and a ground, a second transistor is provided between the second terminal and the ground, a third transistor is provided between the third terminal and the ground, a fourth transistor is provided between the first terminal and the second terminal and a fifth transistor is provided between the first terminal and the third terminal;

and wherein in the first state, the third transistor is in ON state and the fifth transistor is in OFF state, and wherein in the second state, the third transistor is in ON state and the fifth transistor is in OFF state.

3. A switch attenuator according to claim 1 wherein the impedance Z1 is substantially included within a range from 0.5×ZA to 2.0×ZA, the impedance Z2 is substantially included within a range from 0.5×ZT to 2.0×ZT and the impedance Z3 is substantially included within a range from 0.5×ZR to 2.0×ZR, where ZA, ZT and ZR denote impedances of the antenna, the transmitter and the receiver respectively.

4. A switch attenuator according to claim 3 wherein each of the first, second, third, fourth and fifth transistors is a dual-gate field effect transistor having a drain, a source and two gates, one of the two gates being connected to the drain, the other of the two gates being connected to the source and each of the two gates receiving a voltage for an electrical control via a corresponding resistance.

5. A switch attenuator comprising: a first terminal connected to a first antenna; a second terminal connected to a transmitter; a third terminal connected to a receiver; and a fourth terminal connected to a second antenna, thereby switching a first state, a second state, a third state and a fourth state, wherein in the first state, the first terminal is connected to the second terminal and is electrically isolated from the third terminal, the third terminal is connected to a ground, the fourth terminal is electrically isolated from the first, second and third terminals and the ground and the switch attenuator is electrically controllable so as to vary an attenuation amount between the first terminal and the second terminal, while maintaining such a relationship that an impedance Z1 viewed from the first terminal is substantially equal to an impedance Z2 viewed from the second terminal, and wherein in the second state, the first terminal is connected to the third terminal and is electrically isolated from the second terminal, the second terminal is connected to a ground, the fourth terminal is electrically isolated from the first, second and third terminals and the ground and the switch attenuator is electrically controllable so as to vary an attenuation amount between the first terminal and the third terminal, while maintaining such a relationship that the impedance Z1 viewed from the first terminal is substantially equal to an impedance Z3 viewed from the third terminal, and wherein in the third state, the fourth terminal is connected to the second terminal and is electrically isolated from the third terminal, the third terminal is connected to the ground, the first terminal is electrically isolated from the second, third and fourth terminals and the ground and the switch attenuator is electrically controllable so as to vary an attenuation amount between the fourth terminal and the second terminal, while maintaining such a relationship that an impedance Z4 viewed from the fourth terminal is substantially equal to the impedance Z2 viewed from the second terminal, and wherein in the fourth state, the fourth terminal is connected to the third terminal and is electrically isolated from the second terminal, the second terminal is connected to the ground the first terminal is electrically isolated from the second, third and fourth terminals and the ground and the switch attenuator is electrically controllable so as to vary an attenuation amount between the fourth terminal and the third terminal, while maintaining such a relationship that the impedance Z4 viewed from the fourth terminal is substantially equal to the impedance Z3 viewed from the third terminal.

6. A switch attenuator according to claim 5 wherein a first transistor is provided between the first terminal and a ground, a second transistor is provided between the second terminal and the ground, a third transistor is provided between the third terminal and the ground, a fourth transistor is provided between the first terminal and the second terminal a fifth transistor is provided between the first terminal and the third terminal, a sixth transistor is provided between the fourth terminal and a ground, a seventh transistor is provided between the second terminal and the fourth terminal and an eighth transistor is provided between the third terminal and the fourth terminal, and wherein in the first state, the third transistor is in ON state and the fifth, sixth, seventh and eighth transistors are in OFF state, and wherein in the second state, the second transistor is in ON state and the fourth, sixth, seventh and eighth transistors are in OFF state, and wherein in the third state, the third transistor is in ON state and the first, fourth, fifth and eighth transistors are in OFF state, and wherein in the fourth state, the second transistor is in ON state and the first, fourth, fifth and seventh transistors are in OFF state.

7. A switch attenuator according to claim 5 wherein the impedances Z1 and Z4 are substantially included within a range from 0.5×ZA to 2.0×ZA.

the impedance Z2 is substantially included within a range from 0.5×ZT to 2.0×ZT and the impedance Z3 is substantially included within a range from 0.5×ZR to 2.0×ZR, where ZA, ZT and ZR denote impedance of the antenna, the transmitter and the receiver respectively.

8. A switch attenuator according to claim 7, being formed so as to be integrated on a semiconductor substrate.

9. A switch attenuator according to claim 8, further comprising a power amplifier, the power amplifier being formed so as to be integrated on the semiconductor substrate.

10. A switch attenuator according to claim 9, further comprising a low noise amplifier, the low noise amplifier being formed so as to be integrated on the semiconductor substrate.

* * * * *